(12) United States Patent
Khatri et al.

(10) Patent No.: US 10,274,379 B2
(45) Date of Patent: Apr. 30, 2019

(54) TEMPERATURE MONITORING OF HIGH VOLTAGE DISTRIBUTION SYSTEM COMPONENTS

(71) Applicant: Hubbell Incorporated, Shelton, CT (US)

(72) Inventors: Mohamed Fayaz Khatri, Macedonia, OH (US); Michael Geoffrey Comber, Copley, OH (US)

(73) Assignee: Hubbell Incorporated, Shelton, CT (US)

( * ) Notice: Subject to any disclaimer, the term of this patent is extended or adjusted under 35 U.S.C. 154(b) by 87 days.

(21) Appl. No.: 15/064,900

(22) Filed: Mar. 9, 2016

(65) Prior Publication Data

US 2016/0265978 A1    Sep. 15, 2016

Related U.S. Application Data

(60) Provisional application No. 62/130,969, filed on Mar. 10, 2015, provisional application No. 62/155,561, filed on May 1, 2015.

(51) Int. Cl.
| | |
|---|---|
| *G08B 17/00* | (2006.01) |
| *G01K 1/02* | (2006.01) |
| *H02H 1/04* | (2006.01) |
| *G01K 1/14* | (2006.01) |
| *H01C 7/12* | (2006.01) |

(52) U.S. Cl.
CPC ............... *G01K 1/024* (2013.01); *G01K 1/14* (2013.01); *H02H 1/04* (2013.01); *H01C 7/12* (2013.01)

(58) Field of Classification Search
CPC ............. G01K 1/024; G01K 1/14; H02H 1/04
USPC ......................................................... 340/588
See application file for complete search history.

(56) References Cited

U.S. PATENT DOCUMENTS

| | | | |
|---|---|---|---|
| 4,855,671 A * | 8/1989 | Fernandes | G01K 1/024 324/127 |
| 6,252,754 B1 | 6/2001 | Chaudhry et al. | |
| 6,433,989 B1 | 8/2002 | Hinrichsen et al. | |
| 9,068,894 B2 * | 6/2015 | Nelson | B29C 35/0288 |
| 2003/0214336 A1 | 11/2003 | Watanabe | |
| 2006/0084419 A1 * | 4/2006 | Rocamora | G08C 17/02 455/419 |
| 2008/0077336 A1 | 3/2008 | Fernandes | |
| 2008/0136578 A1 * | 6/2008 | Kruska | H01C 1/02 338/21 |

(Continued)

FOREIGN PATENT DOCUMENTS

| | | |
|---|---|---|
| DE | 29806535 | 6/1998 |
| WO | 9950865 | 10/1999 |

OTHER PUBLICATIONS

PCT International Search Report and Written Opinion mailed in PCT/2016/021462 dated Jul. 12, 2016.

(Continued)

*Primary Examiner* — Naomi J Small
(74) *Attorney, Agent, or Firm* — Wissing Miller LLP

(57) ABSTRACT

The present disclosure provides surge arrester units having one or a plurality of sensor assemblies within the surge arrester unit. The sensor assemblies include a first plate, a second plate, a heat absorption member positioned between the first and second plates, and a temperature assembly that senses the temperature of the heat absorption member and transmits the temperature.

18 Claims, 16 Drawing Sheets

(56) References Cited

U.S. PATENT DOCUMENTS

| | | | | |
|---|---|---|---|---|
| 2008/0291596 A1* | 11/2008 | Kruska | .................... | H01C 7/12 |
| | | | | 361/120 |
| 2012/0162839 A1* | 6/2012 | Wiederhold | ......... | G01R 31/028 |
| | | | | 361/65 |
| 2014/0176336 A1* | 6/2014 | Li | ........................ | G01R 31/025 |
| | | | | 340/870.01 |
| 2015/0200529 A1* | 7/2015 | Dubois | .................. | H02G 13/80 |
| | | | | 174/520 |

OTHER PUBLICATIONS

European Search Report mailed in EP 16762381.8 dated Oct. 4, 2018 (12 pages).

\* cited by examiner

TEMPERATURE MONITORING OF HIGH VOLTAGE DISTRIBUTION SYSTEM COMPONENTS

CROSS-REFERENCE TO RELATED APPLICATIONS

This application claims priority to U.S. Provisional Application No. 62/130,969, filed on Mar. 10, 2015, entitled "Temperature Monitoring of Surge Arresters", and to U.S. Provisional Application No. 62/155,561, filed on May 1, 2015, entitled "Temperature Monitoring of High Voltage Distribution System Components" both of which are incorporated herein in their entirety by reference.

BACKGROUND

Field

The present disclosure relates generally to surge arresters, isolators, bushings and other high voltage distribution system components for use in high voltage power distribution systems, and to systems for monitoring the temperature of surge arresters, isolators, and bushings without affecting the performance of the surge arresters, isolators, and bushings.

Description of the Related Art

High voltage power distribution systems use substations as part of the overall electrical generation, transmission, and distribution system. A substation may include transformers to change voltage levels between high transmission voltages and lower distribution voltages, or at the interconnection of two different transmission voltages. Between a power generating station and consumers, electric power may flow through several substations at different voltage levels. On the consumer side of the overall electrical generation, transmission, and distribution system, transformers are used to step down the voltage on the power lines for customer usage.

The purpose of a surge arrester is to divert damaging over-voltage transients (i.e., surges) caused by lightning or switching events, safely to ground, thereby protecting the transformer or other system equipment from damage. Current surge arresters typically include a housing, a connection for a high voltage line on one end, and a connection on the other end for grounding the arrester to the earth ground, and a series of metal-oxide non-linear resistors within the housing between the two connections. Metal-oxide non-linear resistors are sometimes called blocks, zinc oxide discs or blocks, metal oxide blocks, or metal-oxide surge arresters. The one or more blocks of non-linear resistors form one or more varistors. Typically, the ground connection side of the surge arrester is connected through a ground-lead disconnector that is integral to or separately attached to a pedestal of isolator bracket.

Metal oxide surge arresters typically have very high reliability and can continue to function as intended for long periods of time if they have been well designed, properly manufactured, and operated within their specified range of applied voltage, temporary overvoltage, surge magnitude and surge energy, and have not been physically damaged by some external force. However, metal-oxide surge arresters do occasionally fail while in service thereby negatively impacting the power distribution system. A surge arrester failure occurs when the arrester is no longer able to support the normal high tension line voltage, and such failure often results in a short circuit on the power system. Most, if not all, surge arrester failure modes have the same end-of life condition—a short circuit. There are various ways in which an arrester can deteriorate to the point of ultimate failure on the power system. Examples of ways in which surge arresters can fail include; moisture ingress to the interior of the arrester, an overvoltage that remains beyond a rated time the metal oxide block temperature is designed for, and block aging.

Surge arrester failures typically result in an operation of a circuit interrupting device (e.g., a circuit breaker, recloser, fuse, etc.), causing disruption of electrical service to consumers. If the surge arrester is equipped with a disconnector, the disconnector should operate when the fault current flows following a surge arrester short circuit, isolating the surge arrester either from the ground or from the line, depending on where the disconnector is installed. Upon re-energization, the failed surge arrester is no longer in the circuit electrically and service can be continued, but with a reduced level of surge protection. In the case of a substation arrester, a failure typically causes a system lockout until either that portion of the substation can be bypassed, or until the surge arrester is physically removed from service. While it is desirable to avoid substation and distribution arrester failures, the consequence of a substation arrester failure is typically much more severe than that of a distribution arrester. Often, a considerably greater disruption of service would accompany a substation arrester failure, and the cost of replacing a substation arrester is typically orders of magnitude greater than that of replacing a distribution arrester.

As a precautionary measure, utilities attempt to monitor surge arresters in the hope that they could detect deterioration in a surge arrester, and remove the surge arrester from service and replace it with a new surge arrester on a planned basis before a costly failure of the surge arrester were to occur.

SUMMARY

In one embodiment, the present disclosure provides surge arrester units. Each surge arrester unit includes a housing having a hollow core, a plurality of blocks positioned in series within the hollow core of the housing, and at least one sensor assembly positioned within the hollow core. The blocks are not limited to any particular shape and in some embodiments the blocks are cylindrical. The at least one sensor assembly is positioned with the hollow core between two of the plurality of blocks. The sensor assemblies include a first plate, a second plate, a heat absorption member positioned between the first and second plates, and a temperature assembly that senses the temperature of the heat absorption member and transmits data corresponding to the measured temperature.

In another embodiment, the present disclosure provides surge arrester assemblies. Each surge arrester assembly includes a pedestal, at least one surge arrester unit mounted on the pedestal, and a receiver antenna mounted to the pedestal.

In still another embodiment, the present disclosure provides each surge arrester assembly includes at least one surge arrester unit, an isolator bracket secured to the at least one surge arrester unit, a mounting bracket secured to the isolator bracket, and a receiver antenna connected to the isolator bracket.

In yet another embodiment, the present disclosure provides a surge arrestor temperature monitoring system. The surge arrestor temperature monitoring system includes a computing device including a display communicatively coupled to a central processing unit (CPU). The CPU causes the execution of instructions of a software application to receive time tagged temperature measurements from at least one temperature assembly having a temperature sensor between two metal oxide blocks in a surge arrestor, compare time tagged temperature measurements against a threshold value, and display a status message to a user based on the comparison of time tagged temperature measurements against a threshold value, wherein the status message includes an alert indication if the time tagged temperature measurements exceed the threshold value.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides surge arresters, isolators, bushings and other high distribution system components with one or more built in sensor assemblies, and systems for monitoring of the temperature of surge arresters, isolators, bushings and other high distribution system components during their lifecycle. For ease of description, the present disclosures refer to surge arresters, but the disclosure also contemplates using the sensor assembly of the present disclosure with surge arresters, isolators, bushings and other high distribution system components.

Figure 1:
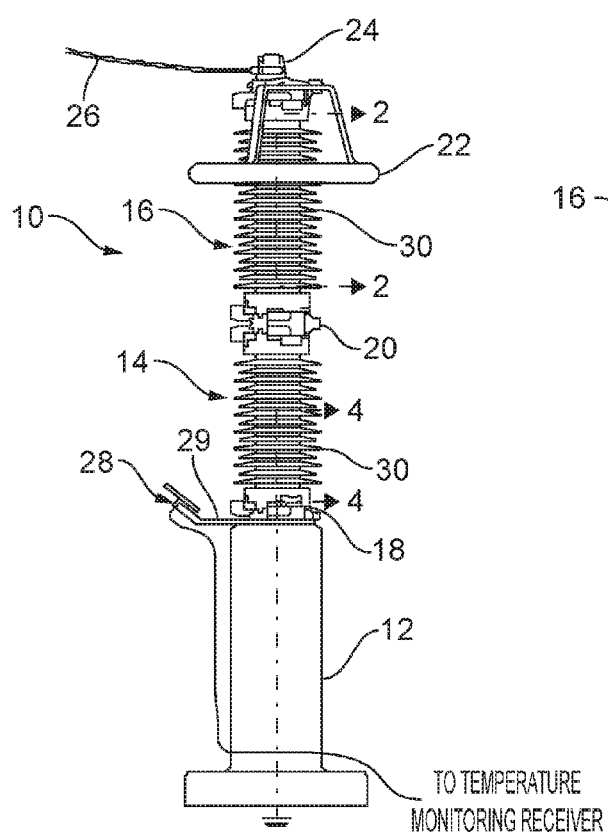
FIG. 1 is an elevation view of an exemplary embodiment of a substation surge arrester according to the present disclosure.

Referring to FIG. 1, an exemplary embodiment of a substation surge arrester assembly (or "substation arrester") according to the present disclosure is provided. The substation arrester 10, shown in FIG. 1, is a two arrester unit substation arrester that includes a pedestal 12 and two arrester units 14 and 16 that are secured to the pedestal 12, as shown. In some embodiments, more than two arrester units 14, 16 are stacked together. The arrester unit 14 is physically and electrically connected to the pedestal 12 through metal connecting joint 18. The arrester units 14 and 16 are physically and electrically connected together through a metal connecting joint 20. A grading ring 22 is connected to terminal 24 on the top arrester unit 16. When installed, the electrical terminal 24 of arrester unit 16 is used to connect the substation arrester 10 to a power line 26, and the pedestal 12 is connected to ground. A receiver antenna 28 is mounted to a bracket 29. The bracket 29 is mounted at a base of the arrester assembly 14 and is electrically coupled to ground potential and the metal connecting joint 18. The receiver antenna 28 transmits radio frequency energy capable of powering a radio frequency identification (RFID) tag through an RFID antenna. The two arrester units 14 and 16 include a housing 30.

Figure 2:
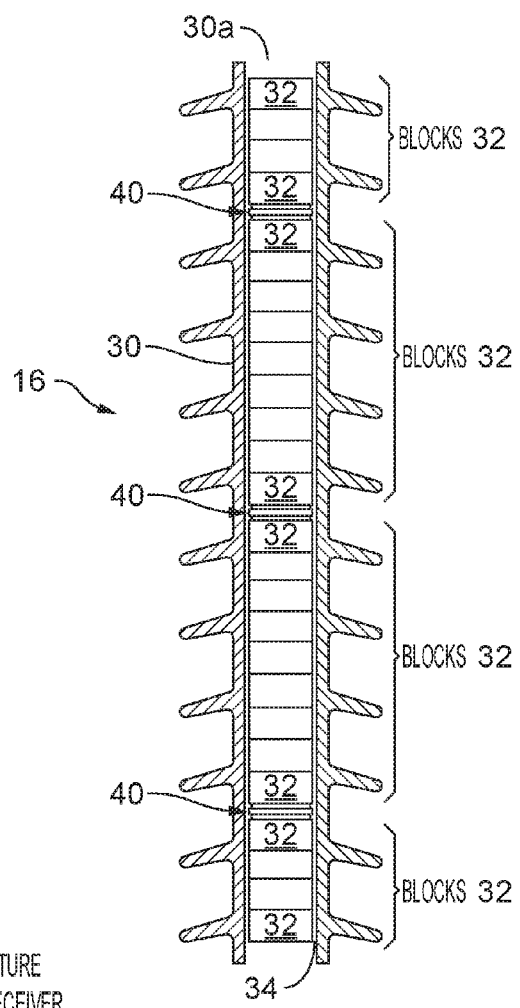
FIG. 2 is a partial cross-sectional view of a surge arrester unit of FIG. 1, taken along line 2-2.

Referring to FIG. 2, each arrester unit 14 and 16 according to the present disclosure includes a housing 30 having a hollow core 30a, a plurality of metal oxide non-linear resistor blocks 32 stacked one on top of the other within the hollow core 30a of the housing 30, and one or more sensor assemblies 50, which will be described in more detail below. The metal oxide non-linear resistors 32 are also known as "blocks". The blocks 32 have a diameter that is less than the diameter of the hollow core 30a so that an air gap 34 forms within the hollow core 30a. The number of blocks 32 used with a substation arrester unit depends upon the overall voltage rating of the substation arrester. For example, a 288 KV substation arrester may have one or more arrester units with between 20 and 30 blocks. An example of an arrester unit 16 with the plurality of blocks 32 and three sensor assemblies 50 is shown in FIG. 2. In this embodiment, arrester unit 16 is a large arrester unit such that three sensor assemblies 50 are within the hollow core between blocks 32 at roughly one-third intervals relative to the overall length of the arrester unit. Spacing the arrester assemblies in this way permits the sensing of the temperature of the arrester unit while keeping manufacturing costs down. However, one skilled in the art would readily understand that more or less than three sensor assemblies may be deployed in any one arrester unit.

Figure 3:
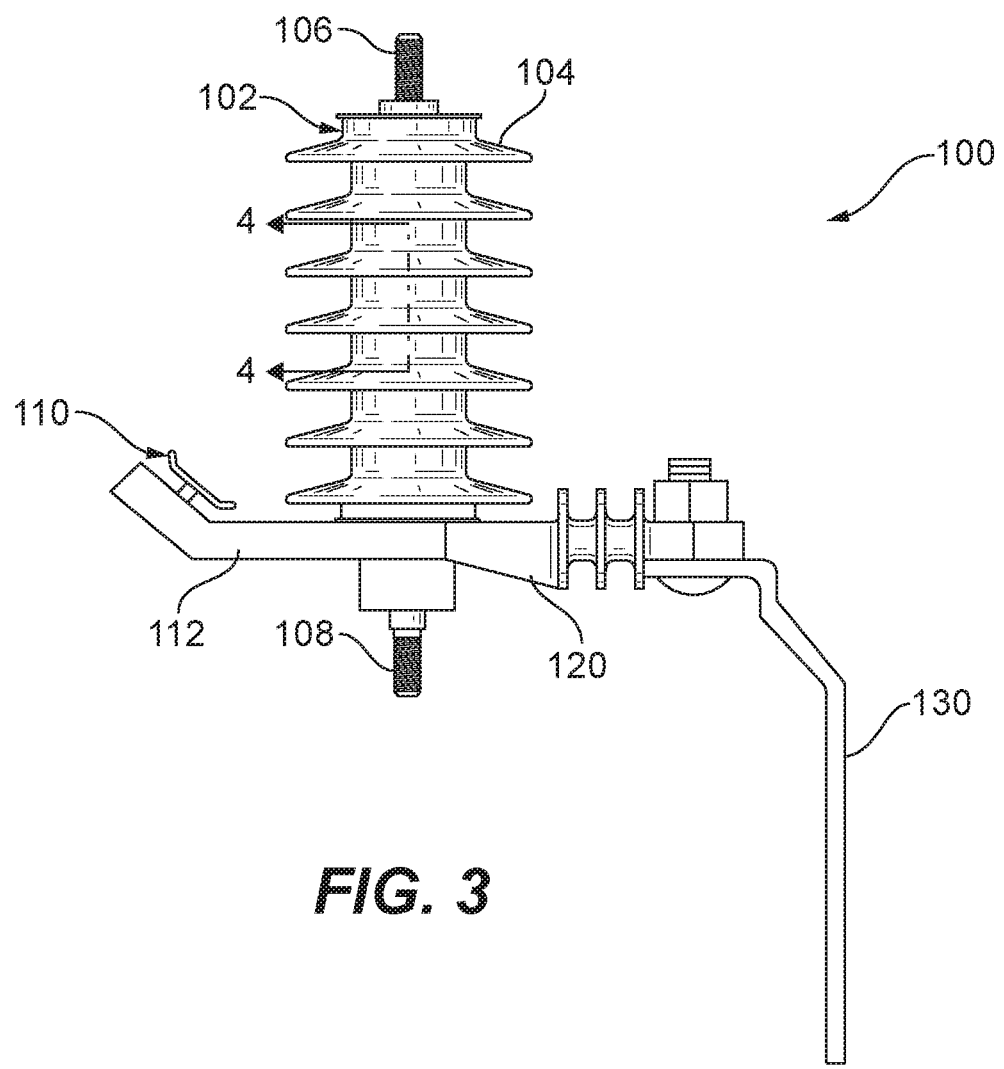
FIG. 3 is an elevation view of an exemplary embodiment of a distribution surge arrester according to the present disclosure.

Referring to FIG. 3, an exemplary embodiment of a distribution surge arrester assembly (or "distribution arrester") according to the present disclosure is provided. The distribution arrester is for protecting equipment on the distribution end of the overall electrical generation, transmission, and distribution system, such as distribution transformers. Like most distribution arresters, the distribution arrester shown in FIG. 3 is a single unit arrester.

The distribution arrester 100 includes an arrester unit 102 having a housing 104, a terminal 106 for connecting to a power line, a terminal 108 for connecting to ground, a transceiver 110 mounted to bracket 112, an isolator bracket 120, and a mounting bracket 130, e.g., a transformer mounting bracket. The transceiver bracket 112 may be a separate bracket or it may be part of the isolator bracket 120. The arrester unit 102 is mounted to the isolator bracket 120 typically with a nut and bolt, and the isolator bracket is mounted to the mounting bracket 130 typically with a nut and bolt. The mounting bracket 120 would then be bolted to the device the distribution arrester is protecting, e.g., a transformer tank, or the mounting bracket would be mounted in close proximity to the device the arrester is protecting.

For the ease of description, the arrester units for the substation arresters 10 and the arrester units for the distribution arresters 100 will be referenced collectively as arrester unit 16 and share common features, except as disclosed herein and in the Figures. The housing 30 for the substation arrester units 14, 16 and the housing 104 for the distribution arrester units 102 will be referenced collectively as housing 30 and share common features, except as disclosed herein and in the Figures.

Figure 13:
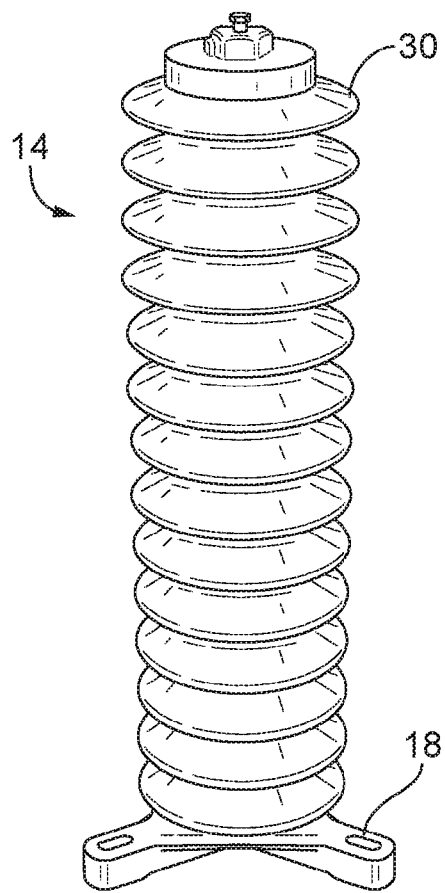
FIG. 13 is an elevation view of an exemplary embodiment of a substation surge arrester according to the present disclosure.
Figure 14:
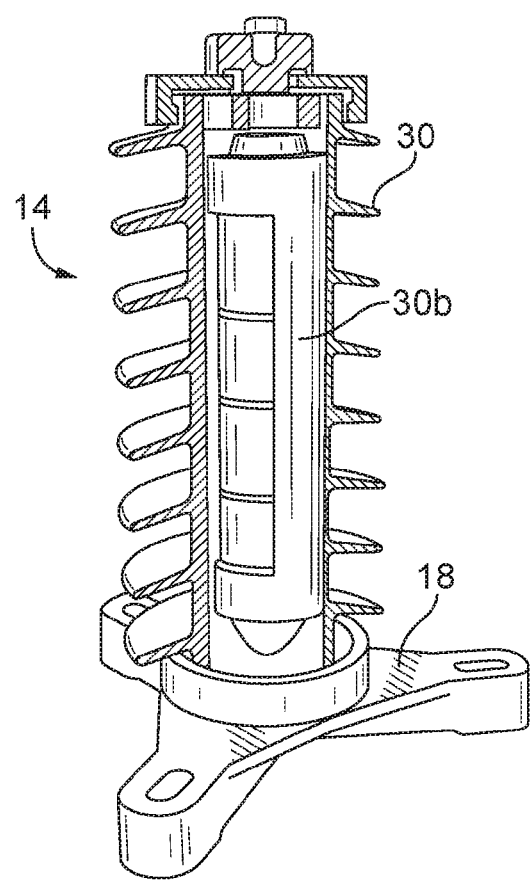
FIG. 14 is a perspective view of the substation surge arrester of FIG. 13, illustrating a solid core housing.

The embodiments of the arrester housings 30 shown in FIGS. 2 and 3 are hollow core housings. The present disclosure also contemplates solid core housings 30, seen in FIGS. 13 and 14, where the interior of the housing has a plurality of blocks 32 and one or more sensor assemblies positioned between the blocks 32 as described herein, and the center of the housing is filled with a dielectric material 30b, such as a silicone dielectric compound, so the housing 30 is free of air and moisture.

Figure 4:
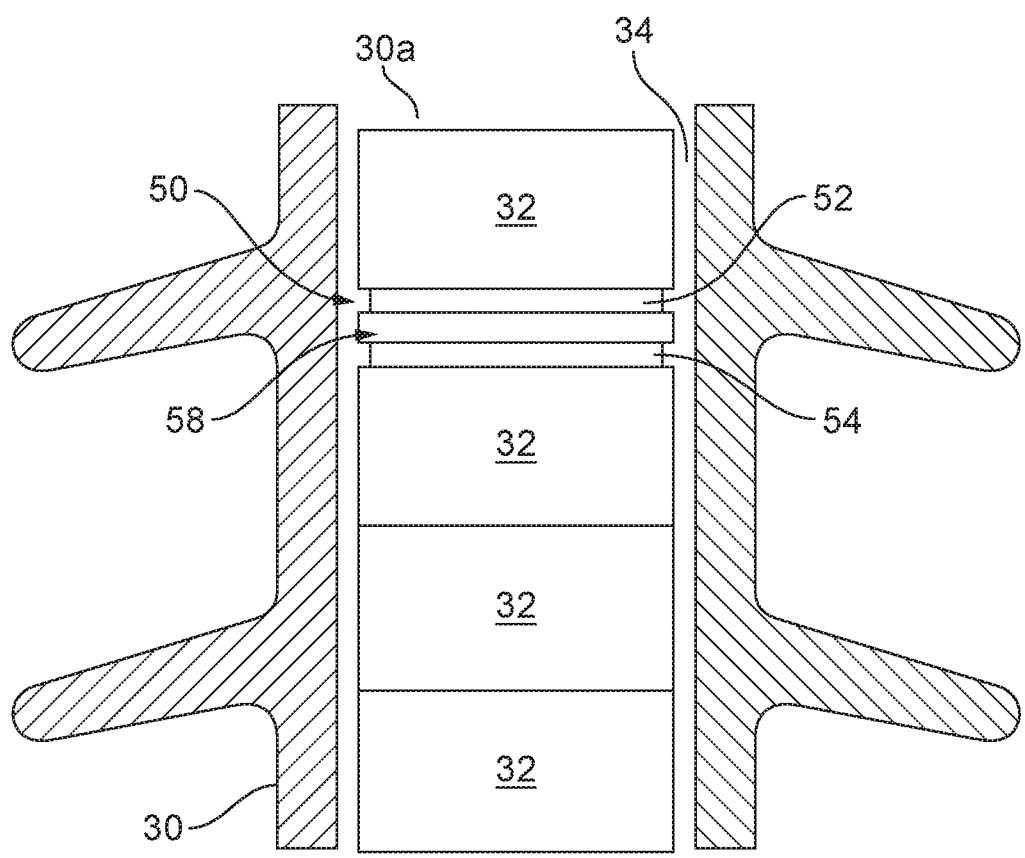
FIG. 4 is a partial cross-sectional view of the surge arresters of FIGS. 1 and 2, taken along line 4-4.

As noted above, the arrester units 16 according to the present disclosure include a plurality of blocks 32 positioned within hollow core 30a of housing 30, as described above. The housing 30 is preferably formed of polymer, porcelain or other non-conductive material. One or more sensor assemblies 50 are positioned within the hollow core 30a of housing 30 between two blocks 32, as seen in FIG. 4. The sensor assemblies 50 monitor the temperature of the blocks 32 adjacent to the sensor assembly 50. The sensor assembly is constructed so as to avoid affecting the performance of the arrester unit as described below.

Figure 5:
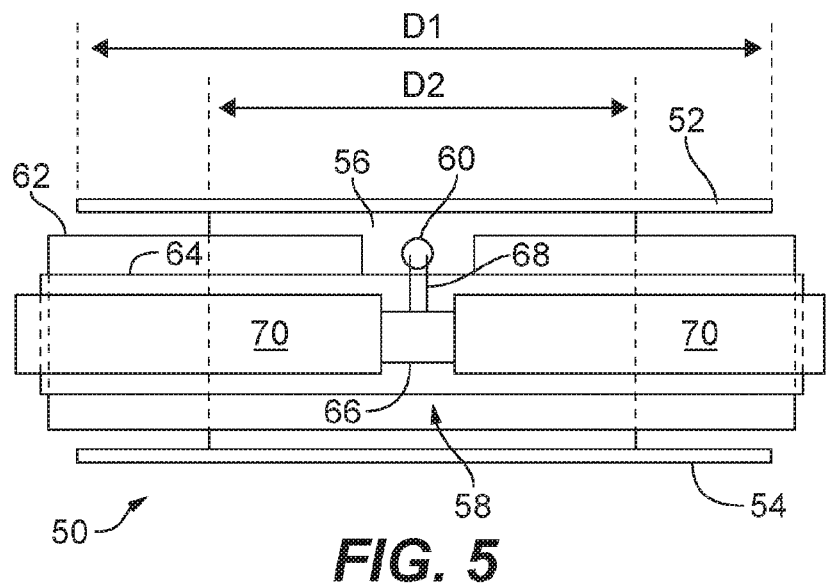
FIG. 5 is a side view of an exemplary embodiment of a sensor assembly according to the present disclosure.
Figure 6:
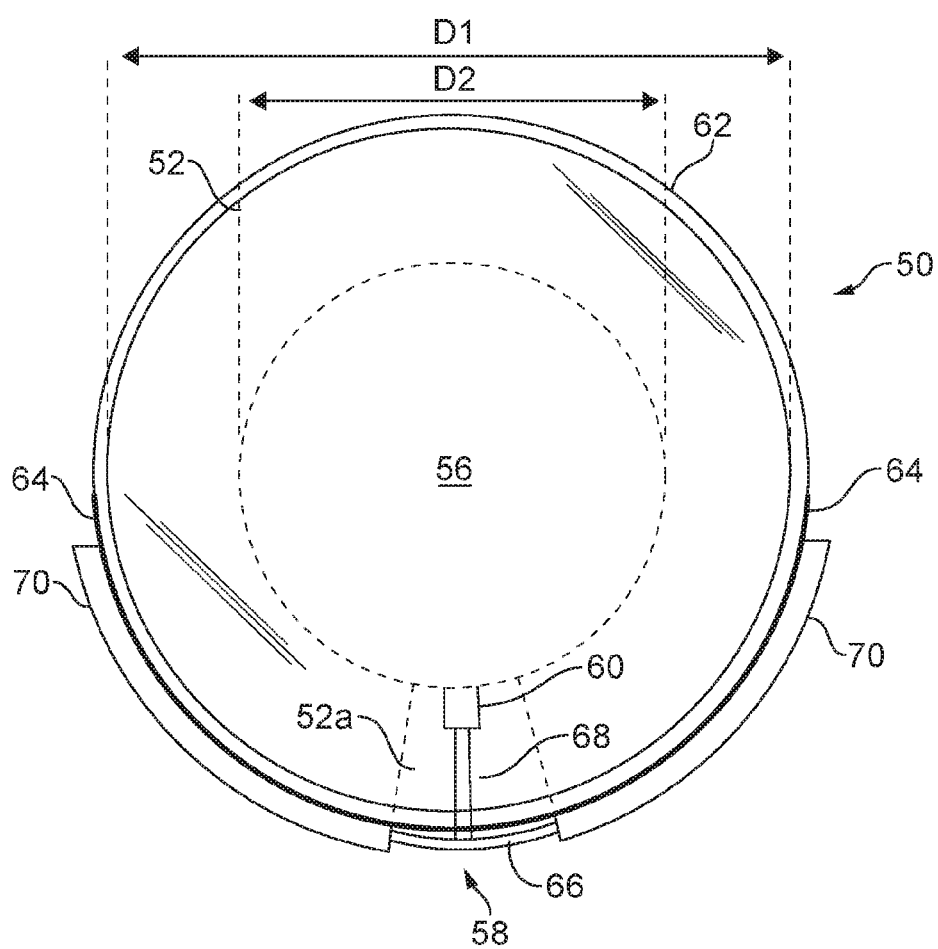
FIG. 6 is a top plan view of the sensor assembly of FIG. 5.

Referring to FIGS. 5 and 6, the sensor assembly 50 according to the present disclosure includes a pair of conductive plates 52 and 54, a heat absorption member 56 positioned between the conductive plates 52 and 54, and a temperature sensor assembly 58. Each of the conductive plates 52 and 54 are cylindrical in shape and have a diameter "D1" that is less than the diameter of the adjacent blocks 32 (as seen in FIG. 4). Preferably, the diameter "D1" is in the range of 29 mm and 100 mm. The conductive plates 52 and 54 are preferably made of metal, such as aluminum or copper, so that they are capable of thermal and electrical conduction to permit the taking of temperature readings and avoid affecting the performance of the arrester unit. However, the conductive plates 52 and 54 can be made of any material that is suitably capable of the requisite thermal and electrical conduction characteristics to permit the taking of temperature readings and avoid affecting the performance of the arrester unit. The heat absorption member 56 is cylindrical in shape and has a diameter "D2" that is preferably less than the diameter of the conductive plates 52, 54. Preferably, the diameter "D2" is in the range of about 50% of the diameter "D1". The heat absorption member 56 is preferably made of metal, such as aluminum or copper, so that it is capable of absorbing heat generated by the blocks 32 and conducting electricity. However, the heat absorption member 56 can be made of any material that is suitably capable of absorbing heat and conducting electricity so as to avoid affecting the performance of the arrester unit while permitting the temperature of the heat absorption member 56 to be sensed. In another embodiment, a single conductive disc could be substituted for the conductive plates 52, 54, and the heat absorption member could be positioned within a hollow core of the single conductive disc.

Figure 7:
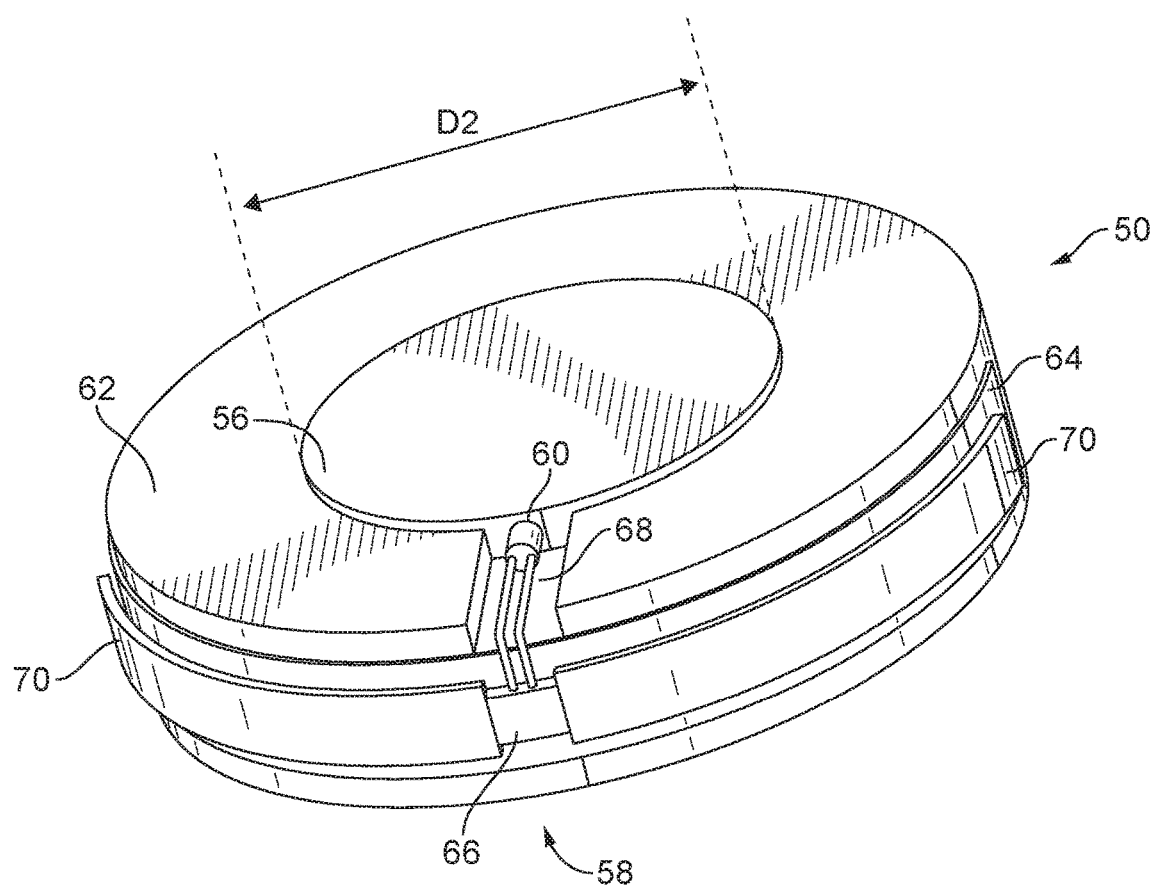
FIG. 7 is a perspective view of the sensor assembly of FIG. 5 with the plates removed.
Figure 8:
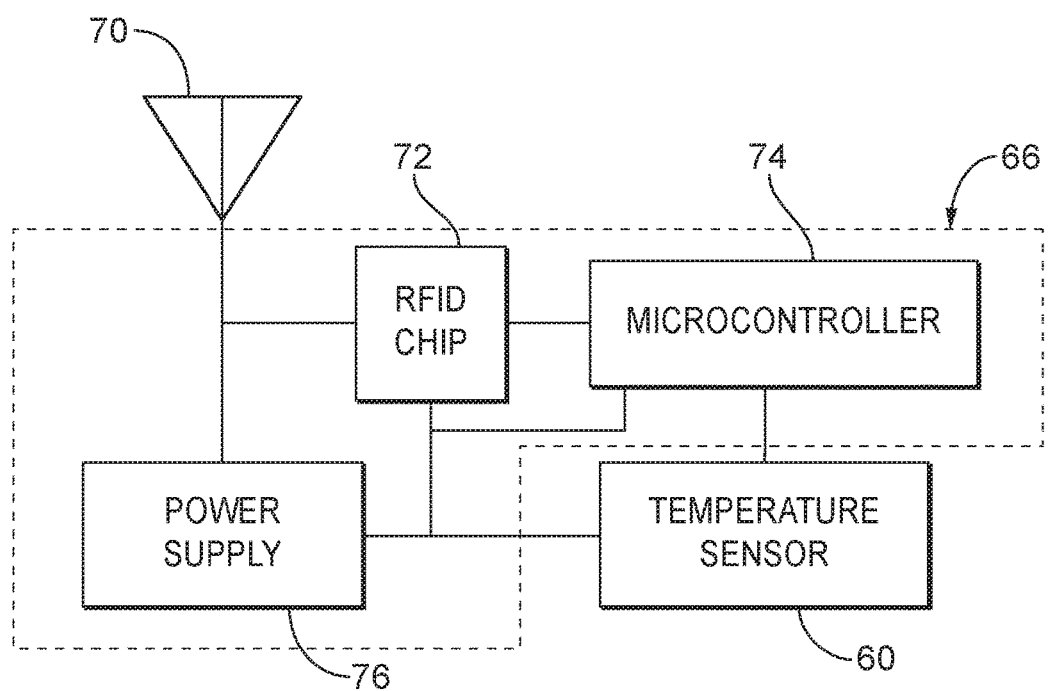
FIG. 8 is a circuit diagram for the sensor assembly according to the present disclosure.

Continuing to refer to FIGS. 5-8, the temperature sensor assembly 58 includes a temperature sensor 60, a support member 62, a substrate 64, a reader 66, sensor wires 68, and a sensor antenna 70. The temperature sensor 60 is secured to the heat absorption member 56 using any suitable fastener, such as mechanical fasteners or adhesives. The temperature sensor 60 may be a thermistor, a thermocouple temperature probe, or other suitable device capable of sensing the temperature of the heat absorption member 56. The support member 62 is secured to the outer surface of the heat absorption member 56 using any suitable fastener, such as mechanical fasteners or adhesives, such that the support member 62 substantially conforms to the shape of the blocks 32 and can fit within the hollow core 30a of housing 30. The support member 62 is preferably made of a material that has a relative permittivity that is similar to the relative permittivity of air so as to not disturb the electric field within the arrester unit, such as Styrofoam, and has a thickness of about 40% of the diameter "D1" of the conductive plates 52 and 54. The substrate 64 is secured to the support member 62 using any suitable fastener, such as mechanical fasteners or adhesives, such that the substrate substantially conforms to the shape of the support member. The substrate 64 has a thickness of between about 80 µm and about 100 µm and can be formed of, for example, polyethylene terephthalate (PET). The reader 66 is secured to the substrate 64 using any suitable fastener, such as mechanical fasteners or adhesives. The reader 66 is a chip set that includes a RFID transceiver 72, a controller, such as microcontroller 74, and a power supply 76, as seen in FIG. 8. The reader 66 is connected to temperature sensor 60 via sensor wires 68, and sends a signal, e.g., an electromagnetic wave, to the temperature sensor which provides power to the temperature sensor 60. The sensor antenna 70 is printed on the substrate 64 and is shaped so as to substantially conform to the shape of the support member 62. The sensor antenna 70 is made of a conductive material, such as copper or silver, and is tuned to the frequency of the signal (i.e., the electromagnetic wave) a temperature monitoring receiver 90 (seen in FIG. 9) sends to the sensor assembly 58 allowing the sensor antenna 70 to couple to the transmitted signal of the temperature monitoring receiver 90. The power supply 76 may be a passive power source having suitable circuitry capable of storing power or a charge, such as a capacitor, or the power supply 76 may be an active power source that is capable of generating power, such as a battery. Electromagnetic energy provided to receiver antenna 28 can be used to charge a passive power supply or recharge an active power source and provide power to the temperature sensor assembly 58.

Once the temperature sensor assembly 58 is powered, the temperature sensor 60 measures the temperature of the heat absorption member 56 and transmits this data back to the reader 66, along sensor wires 68, which can then be transmitted to, for example, the temperature monitoring receiver 90 (seen in FIG. 9) described below, via receiver antenna 28 by a modulated signal e.g., an amplitude modulation signal.

Using the sensor assembly 50 of the present disclosure, heat from the blocks 32 transfers to the conductive plate 52 or 54 and then to heat absorption member 56 raising the temperature of the heat absorption member. The temperature sensor assembly 58 periodically or continuously monitors the temperature of the heat absorption member 56 and transmits temperature readings to receiver antenna 28 via sensor antenna 70.

As noted above, the sensor assembly 50 is also configured to conduct electricity so as to avoid affecting the performance of the arrester unit 16. More specifically, the plates 52 and 54 are preferably made of an electrically conductive material as well as thermally conductive material, and a heat absorption member 56 is preferably made of an electrically conductive material as well as thermally conductive material. As a result, the electrically conductive plates and member permit electricity flowing from one block to the next to flow through the sensor assembly 50 as well.

Figure 15:
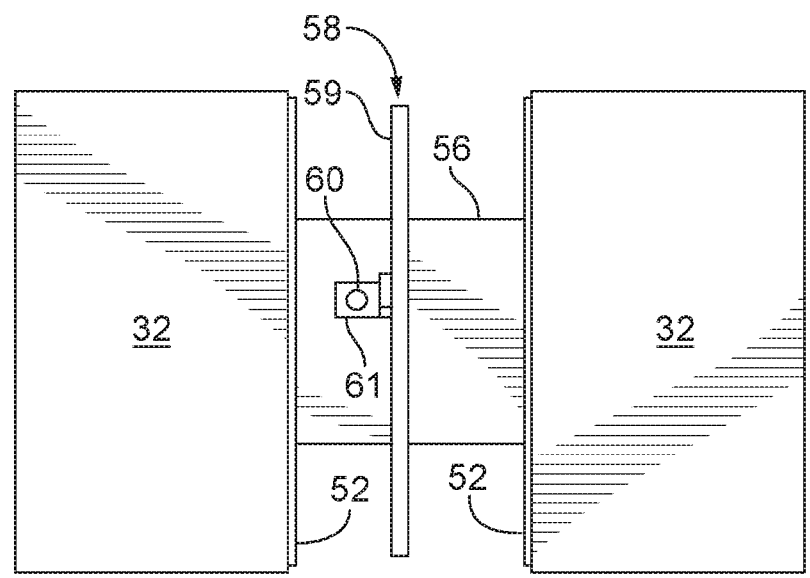
FIG. 15 is a side view of another exemplary embodiment of a sensor assembly according to the present disclosure positioned between a pair of blocks.
Figure 16:
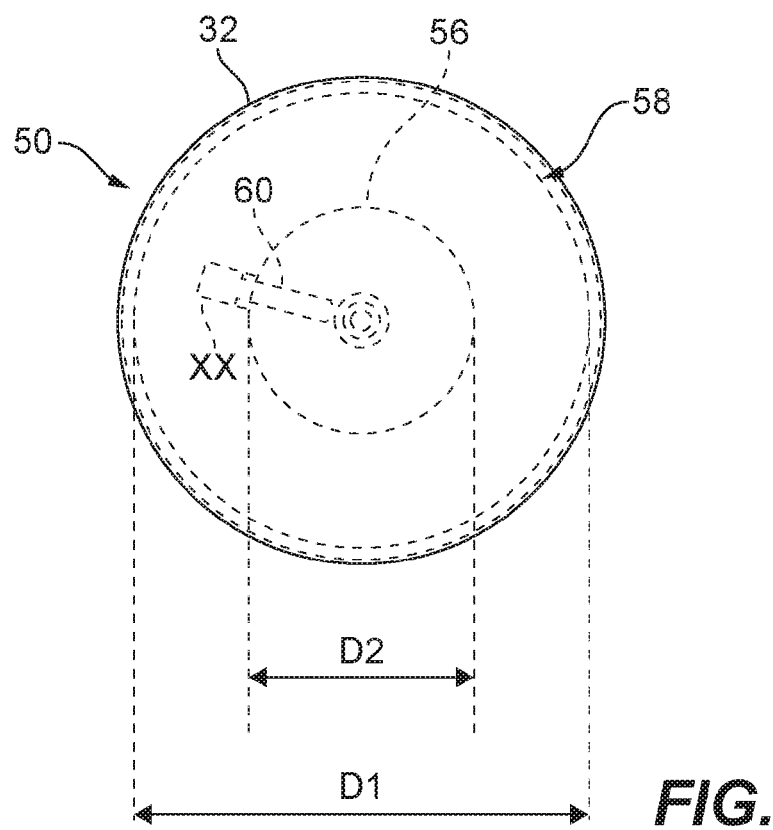
FIG. 16 is a top plan view of the sensor assembly between the pair of block of FIG. 15.
Figure 17:
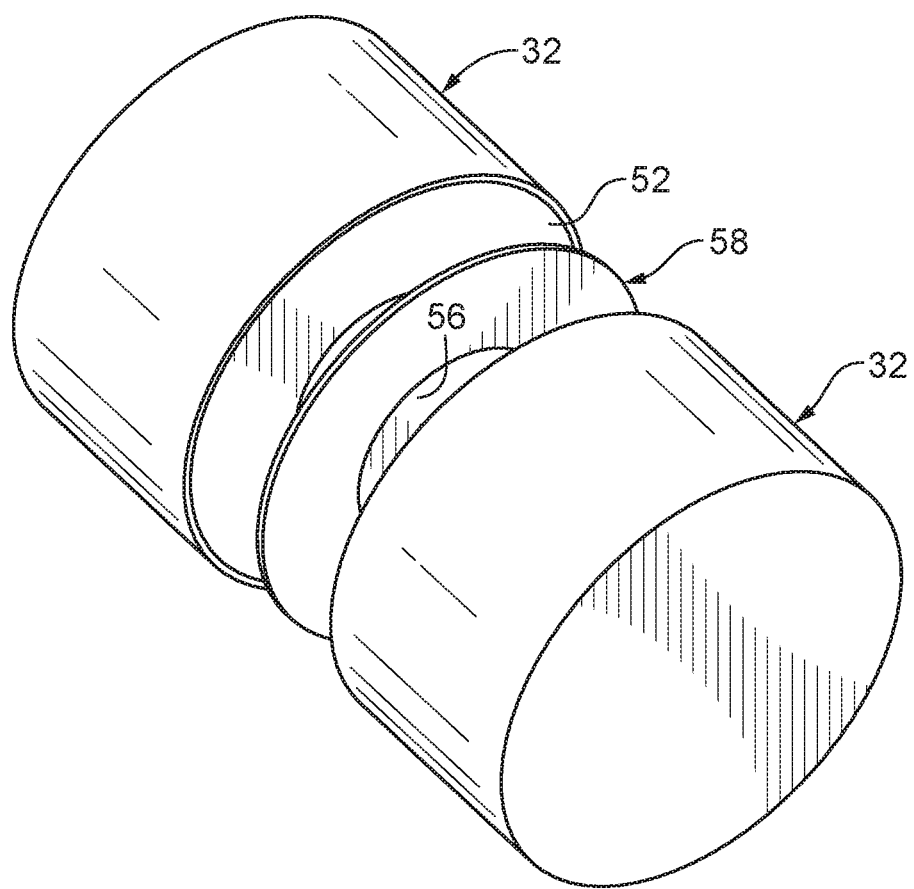
FIG. 17 is a perspective view of the sensor assembly between the pair of block of FIG. 15.

Referring to FIGS. 15-17, another exemplary embodiment of the sensor assembly according to the present disclosure is provided. In this exemplary embodiment, the sensor assembly 50 includes a pair of conductive plates 52 and 54, a heat absorption member (or spacer) 56 positioned between the conductive plates 52 and 54, and a temperature sensor assembly 58. Each conductive plate 52 and 54 is preferably cylindrical in shape and has a diameter "D1" that is less than the diameter of the adjacent blocks 32 (as seen in FIG. 16). Preferably, the diameter "D1" is in the range of 29 mm and 100 mm. The conductive plates 52 and 54 are preferably made of metal, such as aluminum or copper, so that they are capable of electrical and possibly thermal conduction to permit the taking of temperature readings and avoid affecting the performance of the arrester unit. However, the conductive plates 52 and 54 can be made of any material that is suitably capable of the requisite electrical and thermal conduction characteristics to permit the taking of temperature readings and avoid affecting the performance of the arrester unit. The conductive plates 52 and 54 are attached to respective ends of the heat absorption member 56, as shown, so that electricity flowing through the blocks 32 and heat from the blocks can transfer to the heat absorption member 56. The heat absorption member 56 is preferably cylindrical in shape and has a diameter "D2" that is preferably less than the diameter of the conductive plates 52, 54. Preferably, the diameter "D2" is in the range of about 50% of the diameter "D1". Having a heat absorption member 56 with a smaller diameter than the conductive plates creates an air space between the blocks 32, which helps isolate components of the temperature sensor assembly 58 from the high voltages that may pass through the blocks 32 and heat absorption member 56. The heat absorption member 56 is preferably made of metal, such as aluminum or copper, so that it is capable of absorbing heat generated by the blocks 32 and conducting electricity. However, the heat absorption member 56 can be made of any material that is suitably capable of absorbing heat and conducting electricity so as to avoid affecting the performance of the arrester unit while permitting the temperature of the heat absorption member 56 to be sensed.

Continuing to refer to FIGS. 15-19, the temperature sensor assembly 58 according to this exemplary embodiment includes a printed circuit board 59, a temperature sensor 60, a reader 66, a sensor antenna 70, and mounting bracket 61. The printed circuit board 59 can be made from FR4 material with a lead-free HASL finish. As is known in the art, FR-4 is the primary insulating backbone upon which printed circuit boards (PCBs) are produced. A thin layer of copper foil is laminated to one, or both sides of an FR-4 backbone. The PCB is connected to the heat absorption member (or spacer) 56 using, for example, the mounting bracket 61 as a mounting means. Preferably, the PCB 59 is secured to the heat absorption member 56 at a center point of the heat absorption member 56 so that the air space between the blocks 32 helps to isolate components of the temperature sensor assembly 58 from the high voltages that may pass through the blocks 32 and heat absorption member 56. The temperature sensor 60 can be secured to the heat absorption member 56 using any suitable fastener, such as mechanical fasteners or adhesives. The temperature sensor 60 may be a thermistor, a thermocouple temperature probe, or other suitable device capable of sensing the temperature of the heat absorption member 56.

Figure 18:
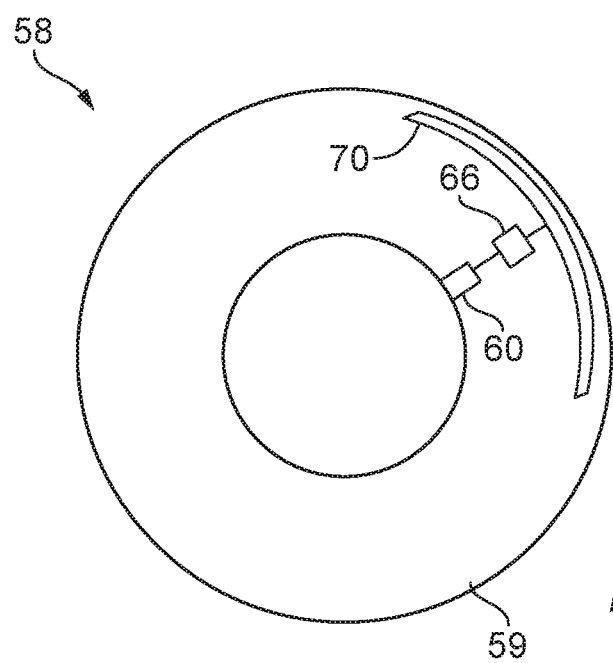
FIG. 18 is a top plan view of another exemplary embodiment of a sensor assembly according to the present disclosure.
Figure 19:
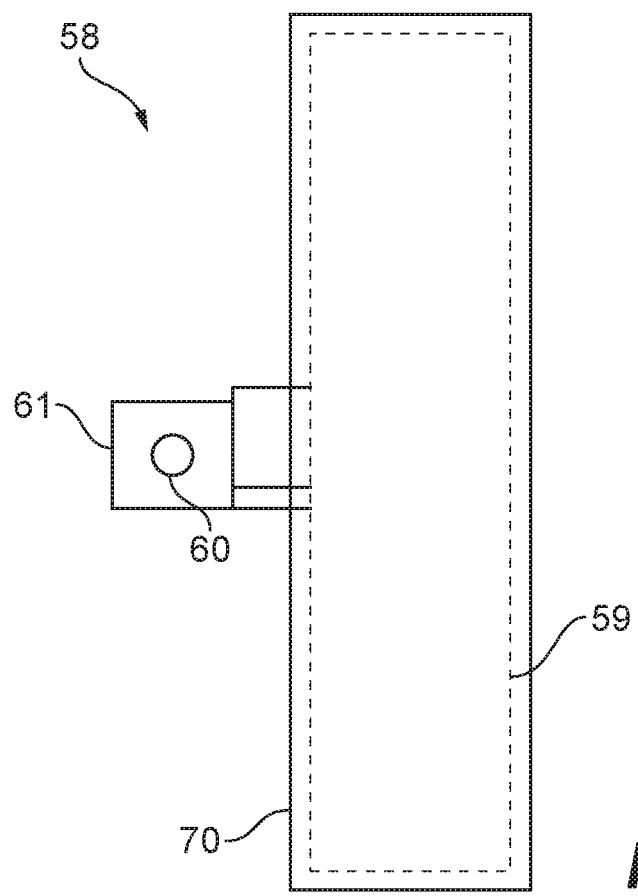
FIG. 19 is a side view another exemplary embodiment of a sensor assembly according to the present disclosure.

The reader 66 is mounted onto the PCB 59 and electrically connected to temperature sensor 60. The reader 66 is a chip set that includes a RFID transceiver 72, a controller, such as microcontroller 74, and a power supply 76, as seen in FIG. 8. The reader 66 sends a signal, e.g., an electromagnetic wave, to the temperature sensor which provides power to the temperature sensor 60. The sensor antenna 70 may be printed on the PCB 59 and shaped so as to substantially conform to the outer shape of the PCB, as seen in FIG. 18. In an alternative embodiment, the sensor antenna 70 may be attached to the PCB 59 so that the sensor antenna 70 substantially conforms to the shape of the PCB, as seen in FIG. 19. The sensor antenna 70 is made of a conductive material, such as copper or silver, and is tuned to the frequency of the signal (i.e., the electromagnetic wave) the temperature monitoring receiver sends to the sensor assembly 58 allowing the sensor antenna 70 to couple to the transmitted signal of the temperature monitoring receiver 90 (seen in FIG. 9). The power supply 76 may be a passive power source having suitable circuitry capable of storing power or a charge, such as a capacitor, or the power supply 76 may be an active power source that is capable of generating power, such as a battery. Electromagnetic energy provided to receiver antenna 28 can be used to charge a passive power supply or recharge an active power source and provide power to the temperature sensor assembly 58. Once the temperature sensor assembly 58 is powered, the temperature sensor 60 measures the temperature of the heat absorption member 56 and transmits this data back to the reader 66, which can then be transmitted to, for example, a temperature monitoring receiver 90 described below, via receiver antenna 28 by a modulated signal e.g., an amplitude modulation signal.

Figure 20:
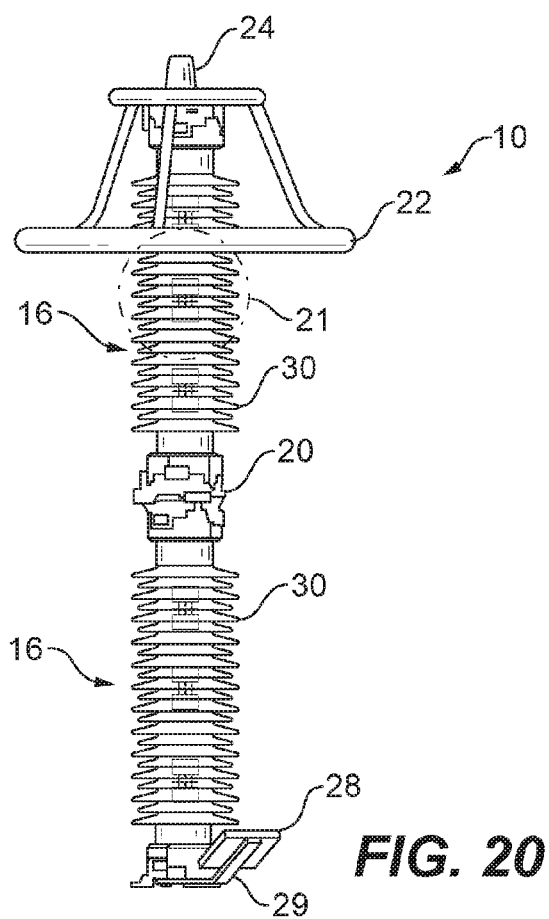
FIG. 20 is an elevation view of another exemplary embodiment of a substation surge arrester according to the present disclosure.
Figure 21:
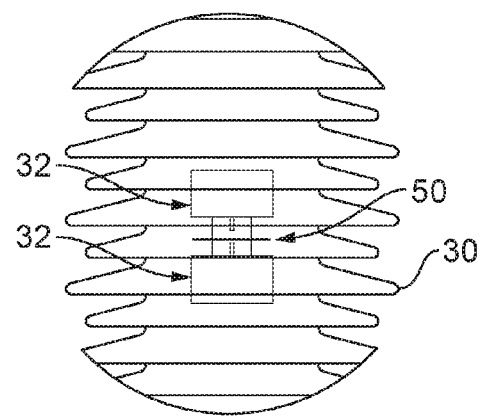
FIG. 21 is a detailed view of a portion of the substation surge arrester of FIG. 18.
Figure 22:
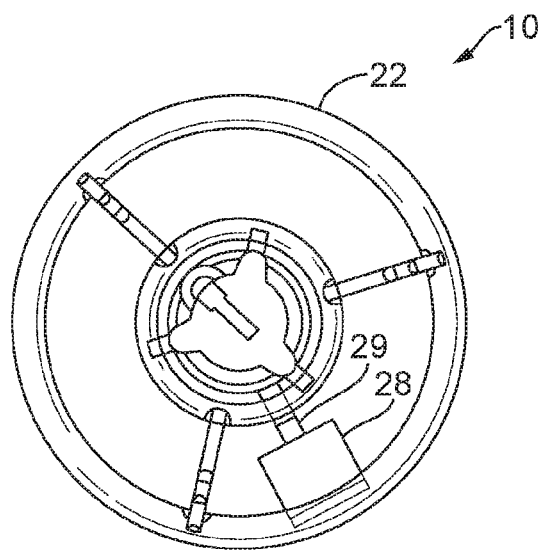
FIG. 22 is a top plan view of the substation surge arrester of FIG. 18.
Figure 23:
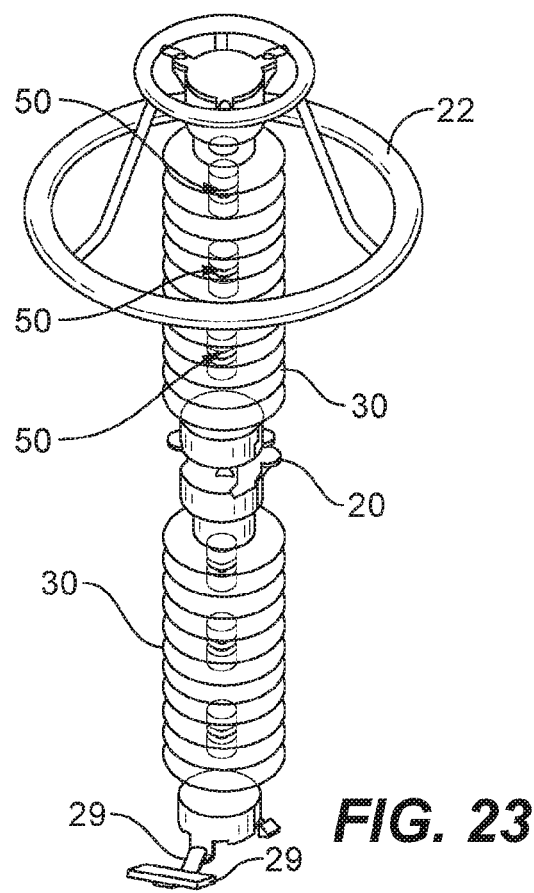
FIG. 23 is an overhead perspective view of the substation surge arrester of FIG. 18.

Using the sensor assembly 50 of this exemplary embodiment, heat from the blocks 32 transfers to conductive plate 52 or 54 and then to heat absorption member 56 raising the temperature of the heat absorption member. The temperature sensor assembly 58 periodically or continuously monitors the temperature of the heat absorption member 56 and transmits temperature readings to receiver antenna 28 (seen in FIGS. 9 and 20) via sensor antenna 70.

As noted above, the sensor assembly 50 is also configured to conduct electricity so as to avoid affecting the performance of the arrester unit. More specifically, the plates 52 and 54 are preferably made of an electrically conductive material as well as thermally conductive material, and a heat absorption member 56 is preferably made of an electrically conductive material as well as thermally conductive material. As a result, the electrically conductive plates and member permit electricity flowing from one block to the next to flow through the sensor assembly 50 as well.

Similar to the embodiment of the sensor assembly above with regard to FIGS. 5-7, one or more sensor assemblies of FIGS. 15-17 can be positioned within or otherwise attached to a surge arrester 16. Referring to FIGS. 20-23, each arrester unit 16 includes a housing 30 having a hollow core 30a, a plurality of blocks 32 stacked one on top of the other within the hollow core 30a of the housing 30, and one or more sensor assemblies 50. The blocks 32 have a diameter that is less than the diameter of the hollow core 30a so that an air gap 34 (seen in FIG. 4) forms within the hollow core 30a. The number of blocks 32 used with a substation arrester unit depends upon the overall voltage rating of the substation arrester, as described above. An example of arrester units 16 each with the plurality of blocks 32 and three sensor assemblies 50 is shown in FIGS. 20-23. In this embodiment, arrester units 16 are large arrester units such that three sensor assemblies 50 are within the hollow core between blocks 32 at roughly one-third intervals relative to the overall length of the arrester unit. Spacing the arrester assemblies in this way permits the sensing of the temperature of the arrester unit while keeping manufacturing costs down. However, one skilled in the art would readily understand that more or less than three sensor assemblies may be deployed in any one arrester unit.

Figure 9:
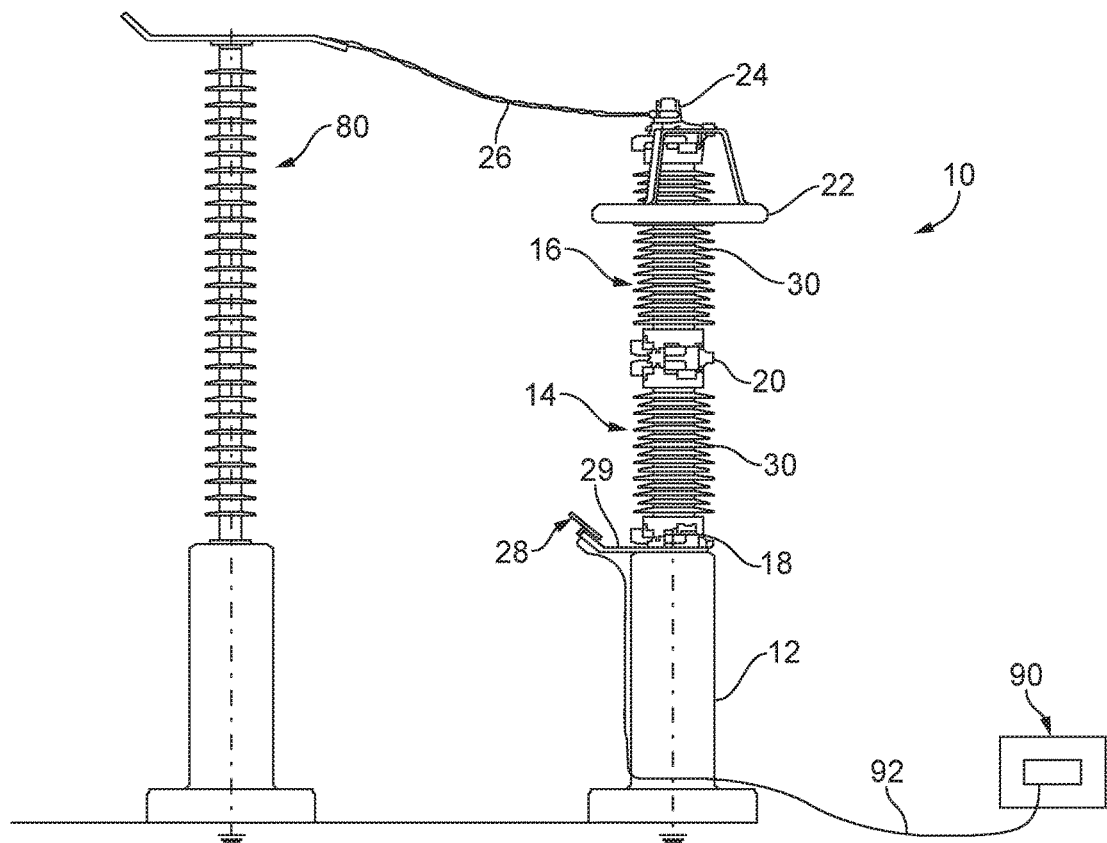
FIG. 9 is a system view of an exemplary embodiment of a system for monitoring the temperature of substation surge arresters according to the present disclosure.

Referring to FIG. 9, an exemplary embodiment of a substation arrester monitoring system is disclosed. In this exemplary embodiment, the substation arrester 10 is protecting an isolator 80, and the substation arrester is connected to a temperature monitoring receiver 90, such that the substation arrester and temperature monitoring receiver form the substation arrester monitoring system. The temperature monitoring receiver 90 contains a central processing unit (CPU) for executing a software application. In some embodiments, the temperature monitoring receiver 90 may be a smart phone, tablet or other mobile computing device capable of executing the instructions associated with the software application. The temperature monitoring receiver 90 is connected to the substation arrester's receiver antenna 28 via cable 92. The temperature monitoring receiver 90 receives temperature readings from the substation arrester 10 continuously in real time, or on a periodic basis, or by pulling temperature readings from the substation arrester. The temperature monitoring receiver 90 time tags each temperature reading and stores the temperature readings and corresponding time tag in memory, e.g., system memory 168 or storage 170, seen in FIG. 12. The temperature monitoring receiver 90 executes the software application to generate reports of the temperature data over a predefined or requested time period and output such reports via output device 174 having a display screen for visual display to user, such as a service technician, seen in FIG. 12. In some embodiments, one or more reports, generated by the software application and displayed by the output device 174, indicate to a user which arrester unit or units 16 have a corresponding temperature history exceeding a threshold value. The software application executing on the CPU of the temperature monitoring receiver 90 can also compare temperature readings to a threshold value to provide an alert indication to the user whether a particular surge arrester 16 has aged to a point where it should be replaced. The threshold value may be based on cumulative temperature measurements, an absolute temperature measurement, or any other value based on temperature and/or time limitations. The substation arrester monitoring system can be in communication with a plurality of substation arresters 14, 16 to track and monitor the temperature of a large number of surge arrester units. Thus, the substation arrester monitoring system can track increases in the temperature of one surge arrester or a plurality of surge arresters over time and could be used to determine when a deteriorated surge arrester would need to be replaced prior to reaching the point of thermal instability and failure. The user, by observing that the software application executing on the temperature monitoring receiver 90 indicates that surge arrester 16 replacement is indicated, can correspondingly replace the indicated surge arrester and potentially avoid a failed surge arrester and associated electrical outage situation, thereby enhancing the reliability of the electricity distribution network.

Figure 10:
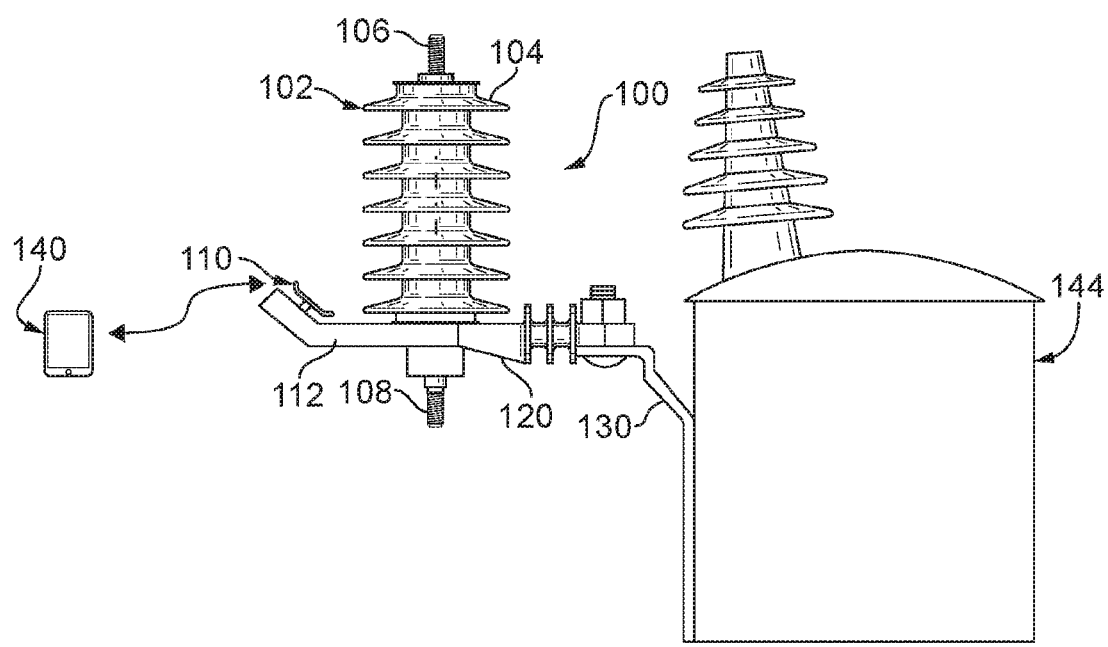
FIG. 10 is a system view of an exemplary embodiment of a system for monitoring the temperature of distribution surge arresters according to the present disclosure.

Referring to FIG. 10, an exemplary embodiment of a distribution arrester monitoring system is disclosed. The distribution arrester monitoring system, using a software application, perform an analogous function to that described with respect to FIG. 9, to identify one or more surge arresters for replacement to avoid surge arrester failure. In this exemplary embodiment, the distribution arrester 102 is protecting a distribution transformer 144. When in the field, a user, such as a service technician, carrying a portable computing device 140 with a wireless receiver could communicate with the surge arrester transceiver 110 to obtain the temperature readings of the sensor assemblies 50 within the housing 104. The portable computing device 140 contains a CPU for executing a software application. In some embodiments, the portable computing device 140 may be a smart phone, tablet or other mobile computing device capable of executing the instructions associated with the software application. In this embodiment, the distribution arrester 100 and portable computing device 140 form the distribution arrester monitoring system. The portable computing device 140 receives temperature readings from the distribution arrester 100 when the portable computing device 140 is in proximity of the transceiver 110. The portable computing device 140 time tags each temperature reading and stores the temperature readings and corresponding time tag in memory, e.g., system memory 168 or storage 170, seen in FIG. 12. The portable computing device 140 executes the software application to generate one or more reports of the temperature data over a predefined or requested time period for display on a display screen associated with the portable computing device for visual display to the user, such as the service technician. In some embodiments, one or more reports, generated by the software application and displayed by the portable computing device 140, provide an alert indication to the user which arrester unit or units 100 have a corresponding temperature history exceeding a threshold value. The software application executing on the CPU of the portable computing device 140 can also compare temperature readings to a threshold value to make a determination whether a particular surge arrester has aged to a point where it should be replaced. The threshold value may be based on cumulative temperature measurements, an absolute temperature measurement, or any other value based on temperature and/or time limitations. Thus, the distribution arrester monitoring system can track increases in surge arrester temperature over time and be used to determine when a deteriorated surge arrester should be replaced prior to reaching the point of thermal instability and failure. The user, by observing that the software application executing on the portable computing device 140 indicates that surge arrester 100 replacement is indicated, can correspondingly replace the indicated surge arrester and potentially avoid a failed surge arrester and associated electrical outage situation, thereby enhancing the reliability of the electricity distribution network.

Figure 11:
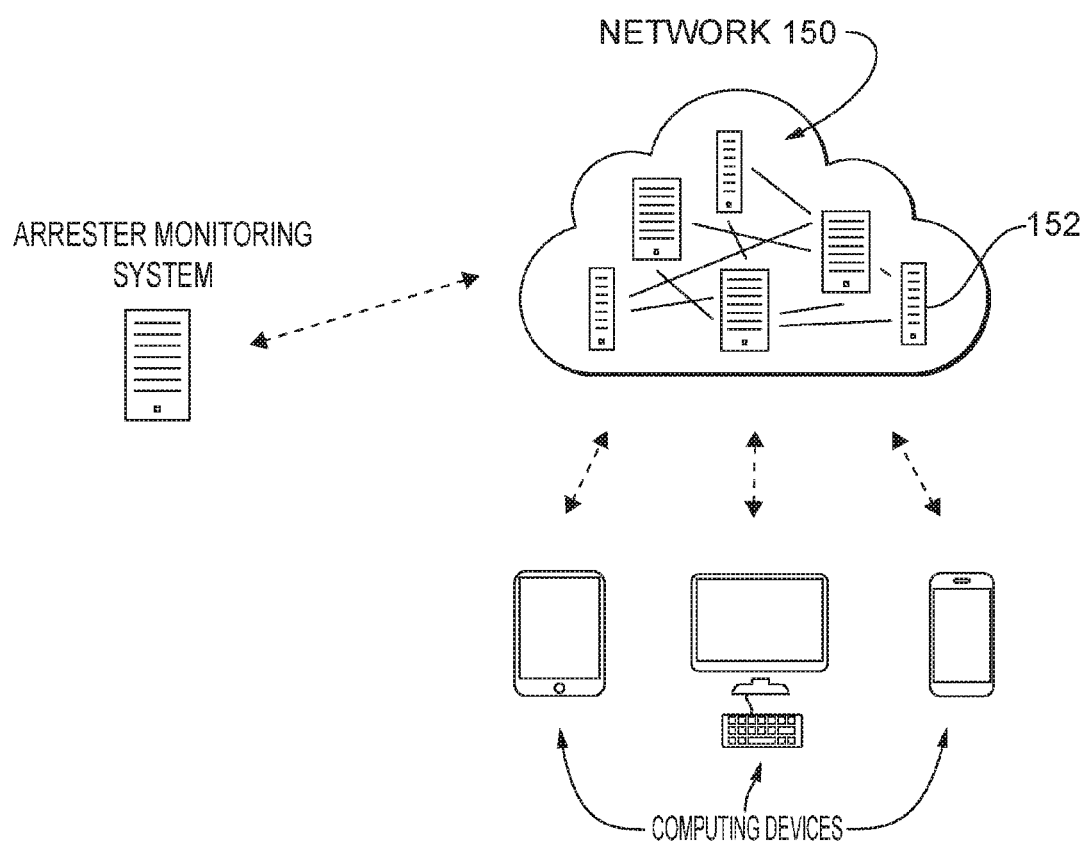
FIG. 11 is an exemplary block diagram of a networked based system for monitoring the temperature of surge arresters.

Referring to FIG. 11, an exemplary network based computing environment is shown in which the substation arrester monitoring system or distribution arrester monitoring system according to the present disclosure may be a part of. In this exemplary embodiment the network computing environment may be the Internet (or web) or a cloud based computing environment. Alternatively, the network topology may be, for example, a local area network (LAN), a wide area network (WAN), a wireless wide area network, a circuit-switched telephone network, a Global System for Mobile Communications (GSM) network, Wireless Application Protocol (WAP) network, a WiFi network, an IEEE 802.11 standards network, and various combinations thereof. The network computing environment 150 includes one or more computing nodes 152, where the system according to the present disclosure would reside. Local (or client) computing devices used by users, such as, for example, personal digital assistants (PDA) or cellular telephones, desktop computers, laptop computers, and/or automobile computer systems may communicate with the system via network 150 and a local web browser. The nodes 152 may also communicate with one another. They may be grouped (not shown) physically or virtually, in one or more networks, such as Private, Community, Public, or Hybrid networks and cloud computing environments, or a combination thereof. This allows the network computing environment 150 to offer infrastructure, platforms and/or software for which users do not need to maintain resources on a local computing device, except for a tool to communicate to the network such as a web browser. It is understood that the types of user computing devices shown in FIG. 11 are intended to be illustrative and that computing nodes 152 and network computing environment 150 can communicate with any type of computerized device over any type of network and/or network addressable connection using, for example, a web browser.

Figure 12:
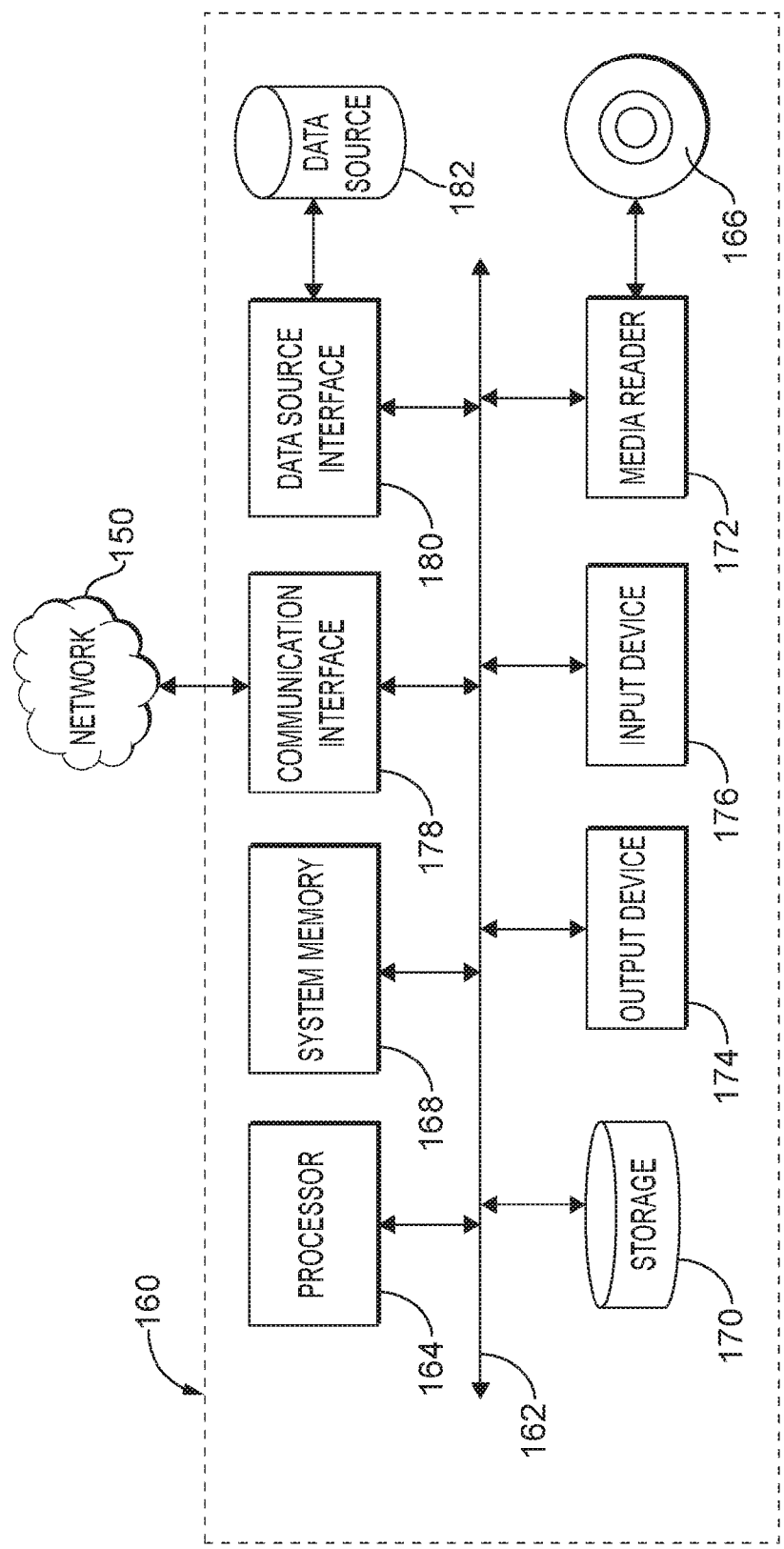
FIG. 12 is an exemplary block diagram of a computing environment for monitoring the temperature of surge arresters.

Referring to FIG. 12, a block diagram of an exemplary embodiment of a computing environment for the substation arrester monitoring system 90 or the distribution arrester monitoring system (140 and 100 as seen in FIG. 10) is shown. In this exemplary embodiment, the computing environment 160 is interconnected via a bus 162. The computing environment 160 includes a processor 164 that executes software instructions or code stored on, for example, a computer readable storage medium 166 or stored in system memory 168, e.g., random access memory, or storage device 170, to perform the processes of the platform disclosed herein including the software application. The processor 164 can include a plurality of cores. The computing environment 160 associated with FIG. 10 may also include a media reader 172 to read the instructions from the computer readable storage medium 166 and store the instructions in storage device 170 or in system memory 168. The storage device 170 provides storage space for retaining static data, such as program instructions that could be stored for later execution. Alternately, with in-memory computing devices or systems or in other instances, the system memory 168 would have sufficient storage capacity to store much if not all of the data and program instructions used for the system, instead of storing the data and program instructions in the storage device 170. Further, the stored instructions may be further compiled to generate other representations of the instructions and dynamically stored in the system memory 168. In either embodiment, the processor 164 reads instructions from the storage device 170 or system memory 168, and performs actions as instructed.

The computing environment 160 may also include an output device 174, such as a display, to provide visual information to users, and an input device 176 to permit certain users or other devices to enter data into and/or otherwise interact with the computing environment 160. One or more of the output or input devices could be joined by one or more additional peripheral devices to further expand the capabilities of the computing environment 160, as is known in the art.

A communication interface 178 is provided to connect the computing environment 160 to the network 150 and in turn to other devices connected to the network 150, including clients, servers, data stores, and interfaces. A data source interface 180 provides access to data source 182, typically via one or more abstraction layers, such as a semantic layer, implemented in hardware or software. For example, the data source 182 may be accessed by user computing devices via network 150. The data source may include databases, such as, relational, transactional, hierarchical, multi-dimensional (e.g., OLAP) databases, object oriented databases, and the like. Further data sources may include tabular data (e.g., spreadsheets, and delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC) and the like. The data source can store spatial data used by the real estate data management system of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As noted, the sensor assembly according to the present disclosure can be used with surge arresters (e.g., substation and distribution arresters) that use metal-oxide blocks. Each arrester unit may include one or a plurality of sensor assemblies to monitor the heat generated by the arresters. The ability to measure the temperature of surge arresters in real time permits the detection of surge arresters that may be in the latter part of their lifecycle enabling power companies to replace aging surge arresters before they fail, which can avoid expensive repairs, time delays and potential power outages. It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

In one embodiment, a surge arrester unit is disclosed. The surge arrester unit includes a housing having a hollow core, a plurality of blocks having non-linear resistance positioned in series within the housing and at least one sensor assembly having a temperature assembly with a temperature sensor positioned within the housing, wherein the at least one sensor assembly is positioned between two of the plurality of blocks.

In another embodiment, a surge arrester unit is disclosed. The surge arrester unit includes a pedestal, at least one surge arrester unit mounted on the pedestal. The at least one surge arrester unit includes a housing having a hollow core, a plurality of metal oxide blocks having non-linear resistance positioned in series within the housing, at least one sensor assembly having a temperature assembly with a temperature sensor positioned within the housing, wherein the at least one sensor assembly is positioned between two of the plurality of blocks and a receiver antenna mounted to one of the pedestal and the surge arrester unit.

In yet another embodiment, a surge arrestor temperature monitoring system is disclosed. The surge arrestor temperature monitoring system includes a computing device including a display communicatively coupled to a central processing unit (CPU). The CPU causes the execution of instructions of a software application to receive time tagged temperature measurements from at least one temperature assembly having a temperature sensor between two metal oxide blocks in a surge arrestor, compare time tagged temperature measurements against a threshold value, and display a status message to a user based on the comparison of time tagged temperature measurements against a threshold value, wherein the status message includes an alert indication if the time tagged temperature measurements exceed the threshold value.

What is claimed is:

1. A surge arrester unit, comprising:
    a rigid unitary surge arrester housing;
    a plurality of blocks positioned in series within the surge arrester housing; and
    at least one sensor assembly positioned within the surge arrester housing between two of the plurality of blocks, the at least one sensor assembly comprising:
        a first conductive plate;
        a second conductive plate;
        a heat absorption member positioned between the first conductive plate and the second conductive plate; and
        a temperature assembly secured to the heat absorption member to sense a temperature of the heat absorption member and transmit a measured temperature.

2. The surge arrester unit according to claim 1, wherein the at least one sensor assembly positioned between the two of the plurality of blocks comprises a plurality of sensor assemblies, and wherein each of the plurality of sensor assemblies are positioned between a different set of two separate blocks of the plurality of blocks.

3. The surge arrester unit according to claim 1, wherein the temperature assembly further comprises:
    a printed circuit board secured to the heat absorption member, wherein the temperature sensor is mounted to the printed circuit board and connected to the heat absorption member such that the temperature of the heat absorption member is measurable by the temperature sensor;
a reader mounted to the printed circuit board and electrically connected to the temperature sensor; and
    a sensor antenna formed on the printed circuit board and electrically connected to the reader, such that measured temperatures of the heat absorption member can be transmitted by the sensor antenna.

4. The surge arrester unit according to claim 1, wherein the temperature assembly further comprises:
    a printed circuit board secured to the heat absorption member, wherein the temperature sensor is mounted to the printed circuit board and connected to the heat absorption member such that the temperature of the heat absorption member is measurable by the temperature sensor;
a reader mounted to the printed circuit board and electrically connected to the temperature sensor; and
    a sensor antenna attached to an outer periphery of the printed circuit board and electrically connected to the reader, such that measured temperatures of the heat absorption member and time tags indicating a time of temperature measurement are transmitted by the sensor antenna.

5. The surge arrester unit according to claim 1, wherein the temperature assembly further comprises:
    a radio frequency identification (RFID) tag communicatively coupled to the temperature sensor.

6. The radio frequency identification (RFID) tag according to claim 5, wherein the radio frequency identification (RFID) tag is wirelessly communicatively coupled to a receiver antenna mounted to a bracket, the bracket being mounted to the surge arrestor unit.

7. A surge arrester assembly, comprising:
    a pedestal;
    at least one surge arrester unit mounted on the pedestal, the at least one surge arrester unit comprising:
        a rigid unitary surge arrester housing;
        a plurality of metal oxide blocks positioned in series within the surge arrester housing;
        at least one sensor assembly positioned within the surge arrester housing, wherein the at least one sensor assembly is positioned between two of the plurality of blocks, the at least one sensor assembly comprising:
            a first conductive plate;
            a second conductive plate;
            a heat absorption member positioned between the first conductive plate and the second conductive plate; and
            a temperature assembly secured to the heat absorption member to sense a temperature of the heat absorption member and transmit a measured temperature; and
        a receiver antenna mounted to one of the pedestal and the surge arrester unit.

8. The surge arrester assembly according to claim 7, wherein the at least one sensor assembly positioned within the housing comprises a plurality of sensor assemblies, and wherein each of the plurality of sensor assemblies are positioned between a different set of two separate blocks of the plurality of blocks.

9. The surge arrester unit according to claim 7, wherein the temperature assembly further comprises:
    a printed circuit board secured to the heat absorption member, wherein the temperature sensor is mounted to the printed circuit board and connected to the heat absorption member such that the temperature of the heat absorption member is measurable by the temperature sensor;
a reader mounted to the printed circuit board and electrically connected to the temperature sensor; and a sensor antenna formed on the printed circuit board and electrically connected to the reader, such that measured temperatures of the heat absorption member can be transmitted by the sensor antenna.

10. The surge arrester unit according to claim 7, wherein the temperature assembly further comprises:
a printed circuit board secured to the heat absorption member, wherein the temperature sensor is mounted to the printed circuit board and connected to the heat absorption member such that the temperature of the heat absorption member is measurable by the temperature sensor;
a reader mounted to the printed circuit board and electrically connected to the temperature sensor; and
a sensor antenna attached to an outer periphery of the printed circuit board and electrically connected to the reader, such that measured temperatures of the heat absorption member and time tags indicating a time of temperature measurement is transmitted by the sensor antenna.

11. The surge arrester unit according to claim 7, wherein the temperature assembly further comprises:
a radio frequency identification (RFID) tag communicatively coupled to the temperature sensor.

12. The surge arrester unit according to claim 11, wherein the radio frequency identification (RFID) tag is communicatively coupled to a receiver antenna mounted to a bracket, the bracket being mounted to the surge arrestor unit.

13. A surge arrestor temperature monitoring system, comprising:
a computing device including a display communicatively coupled to a central processing unit (CPU), the CPU causing the execution of instructions of a software application to:
receive time tagged temperature measurements from at least one surge arrester unit comprising:
a rigid unitary surge arrester housing;
a plurality of blocks positioned in series within the surge arrester housing; and
at least one sensor assembly positioned within the surge arrester housing between two of the plurality of blocks, the at least one sensor assembly comprising:
a first conductive plate;
a second conductive plate;
a heat absorption member positioned between the first conductive plate and the second conductive plate; and
a temperature assembly secured to the heat absorption member to sense a temperature of the heat absorption member and transmit a measured temperature;
compare time tagged temperature measurements against a threshold value, and
display a status message to a user based on the comparison of time tagged temperature measurements against a threshold value, wherein the status message includes an alert indication if the time tagged temperature measurements exceed the threshold value.

14. The surge arrestor temperature monitoring system of claim 13 wherein the threshold value is selected from one of a cumulative threshold value and an absolute threshold value.

15. The surge arrestor temperature monitoring system of claim 13 wherein the threshold value is selected from one of a predetermined value and a user specified value.

16. The surge arrestor temperature monitoring system of claim 13 wherein the display and the CPU are part of a portable device.

17. The surge arrestor temperature monitoring system of claim 13 wherein the computing device is selected from one of a smart phone and a tablet.

18. The surge arrestor temperature monitoring system of claim 13 wherein the surge arrestor is part of one of a substation arrestor and a distribution arrestor.

* * * * *